(12) United States Patent
Stolarchuk et al.

(10) Patent No.: US 11,115,346 B2
(45) Date of Patent: Sep. 7, 2021

(54) SYSTEMS AND METHODS FOR GENERATING NETWORK FLOW INFORMATION

(71) Applicant: Big Switch Networks LLC, Santa Clara, CA (US)

(72) Inventors: Michael Theodore Stolarchuk, Ypsilanti, MI (US); Sandip K. Shah, Milpitas, CA (US)

(73) Assignee: Big Switch Networks LLC, Santa Clara, CA (US)

( * ) Notice: Subject to any disclaimer, the term of this patent is extended or adjusted under 35 U.S.C. 154(b) by 200 days.

(21) Appl. No.: 16/141,562

(22) Filed: Sep. 25, 2018

(65) Prior Publication Data

US 2020/0099630 A1 Mar. 26, 2020

(51) Int. Cl.
*H04L 12/927* (2013.01)
*H04L 12/26* (2006.01)

(52) U.S. Cl.
CPC ............ *H04L 47/80* (2013.01); *H04L 43/062* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 6,751,663 B1 | 6/2004 | Farrell et al. | |
| 7,359,930 B2 | 4/2008 | Jackson et al. | |
| 9,787,567 B1 | 10/2017 | Mehta et al. | |
| 2002/0103772 A1 | 8/2002 | Chattopadhyay | |
| 2009/0327903 A1 | 12/2009 | Smith et al. | |
| 2013/0262703 A1 | 10/2013 | Dong et al. | |
| 2017/0237645 A1* | 8/2017 | Shanbhag | ............ H04L 41/0893 370/250 |

* cited by examiner

Primary Examiner — Ayaz R Sheikh
Assistant Examiner — Sori A Aga
(74) Attorney, Agent, or Firm — Treyz Law Group, P.C.; Tianyi He

(57) ABSTRACT

A packet forwarding network may include switches that forward network packets between end hosts. A monitoring network may be coupled to the forwarding network. A controller may control switches in the monitoring network to forward network packets tapped from the forwarding network to network flow information generation circuitry. The controller may provide configuration information such as record description information to the network flow information generation circuitry. Based on the configuration information, the network flow information generation circuitry may dynamically generate instructions that generate network flow information records. A set of network flow information records may be stored in a repository at the network flow information generation circuitry. The repository may include hash values associated with each of the stored network flow information records. By dynamically generating instructions to populate network flow information records, extraneous generalized instructions may be omitted and network flow information may be more efficiently generated.

20 Claims, 14 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * |  | SEND TO PORT 3 |
| * | * | * | * | 172.12.3.4 | * | * | ... | SEND TO PORT 4 |
| * | * | * | * | * | * | 80 |  | DROP |

FIG. 6B

SYSTEMS AND METHODS FOR GENERATING NETWORK FLOW INFORMATION

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It is often desirable to monitor network traffic that flows through a network and generate flow information based on the network traffic. However, conventional flow information generation schemes often involve performing extraneous instructions that consume large amounts of time and/or generate records with fixed fields for a limited number of record templates.

It may therefore be desirable to be able to provide a network with improved flow information generation capabilities.

SUMMARY

A packet forwarding network may include switches that forward network traffic between end hosts that are coupled to the packet forwarding network. A monitoring network that is not used to forward network traffic between end hosts of the packet forwarding network may have network interfaces that are coupled to the packet forwarding network. The network interfaces of the monitoring network may receive tapped (copied or mirrored) network traffic from the packet forwarding network (sometimes referred to herein as a production network). A controller may be used to control client switches in the monitoring network to forward the tapped network packets along directed network forwarding paths.

The controller may receive a network flow information generation policy (e.g., network traffic monitoring parameters, network flow information parameters, network flow information generation circuitry configuration information, etc.) that identifies a set of flow information to be captured or identifies a set of flow records to be maintained at the network flow information generation circuitry. The network flow information generation policy may include a description of the set of flow records and/or a flow record template. The controller may provide the network flow information generation policy to network flow information generation circuitry such as a service node via a control path is separate from the network packet forwarding paths in the forwarding plane. Based on and after receiving the received network flow information generation policy, processing circuitry in the service node may dynamically generate a set of instructions for generating and/or updating flow records maintained at memory in the service node.

The controller may forward network packets and/or network packet information to the service node via the network interfaces and one or more of the client switches (e.g., a core switch coupled to the service node). The processing circuitry in the service node may execute the set of instructions for each of the forwarded network packets to generate corresponding candidate flow records. The processing circuitry may reconcile or merge the corresponding candidate flow records with any existing flow records maintained at the memory in the service node. At a suitable time, the flow records maintained at the memory and at least a portion of the network flow information generation policy may be exported to an end host coupled to the monitoring network.

In one suitable embodiment, the processing circuitry in the service node may perform hashing functions based on key field information in each candidate flow record (using the key field information as a key input to a hash function) to generate hash values. The generated hash values may be used to perform lookup operations. The generated hash values may also be stored in the memory.

When configured in this way, improved network flow information generation capabilities may be provided. In particular, by using the network flow information generation circuitry to dynamically generate instructions for specifically for a network flow generation policy, network flow information generation circuitry may omit the execution of any excess instructions generally associated with repeatedly interpreting abstract record descriptions while still maintaining flexibility in forming records with various fields.

BRIEF DESCRIPTION OF THE DRAWINGS

FIG. 6B is a diagram of an illustrative forwarding flow table of the type that may be used by a packet processing system showing three illustrative types of packet forwarding that may be performed based on the flow table entries of the flow table in accordance with an embodiment.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
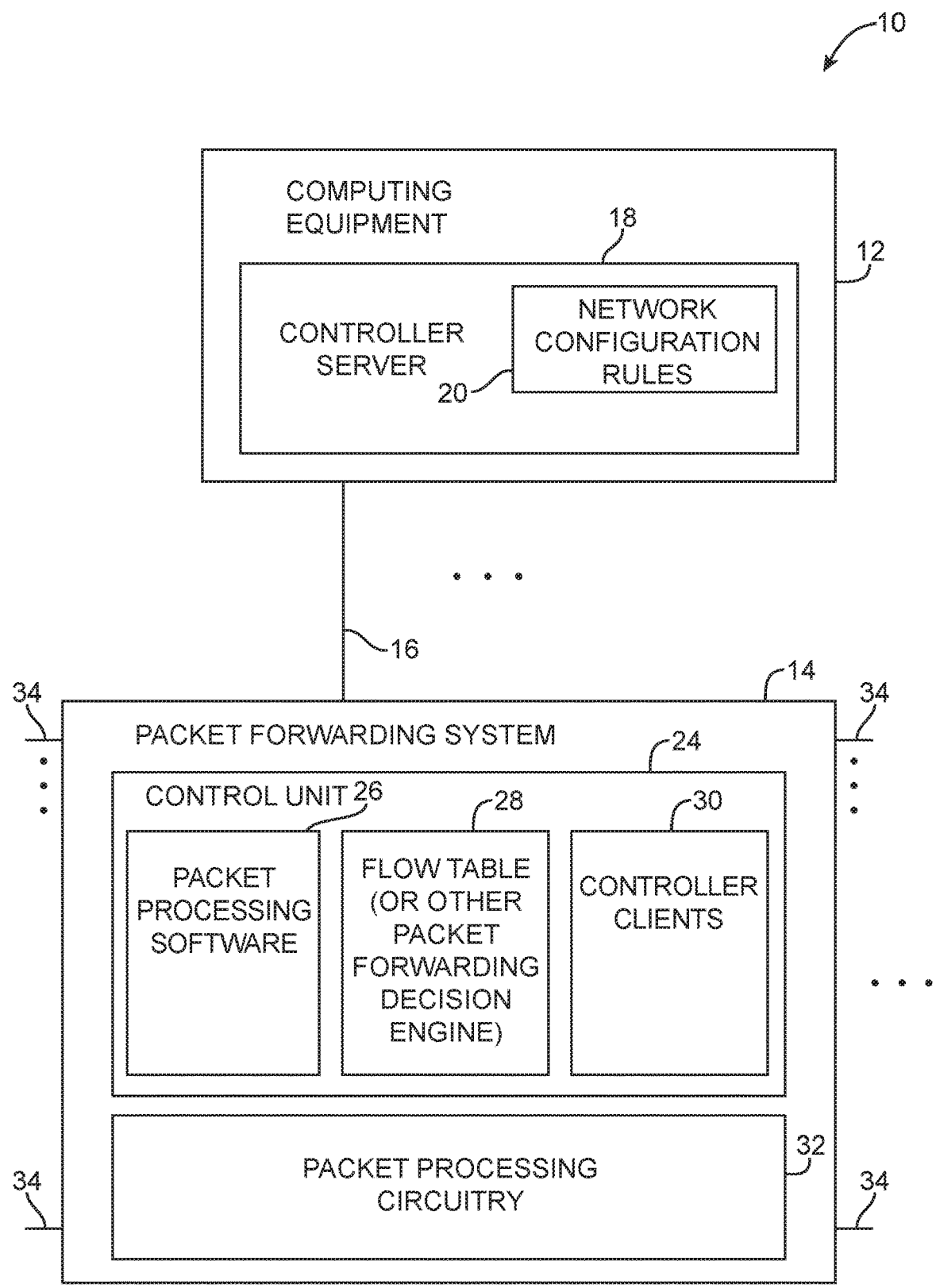
FIG. 1 is a diagram of an illustrative network that includes a controller and a packet forwarding system in accordance with an embodiment.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12. The database may, for example, be stored on storage 13 at controller server 18.

Storage 13 may include computer-readable media such as volatile memory, non-volatile memory, one or more hard drives, flash memory, random access memory (RAM), and/or any desired storage circuitry or devices. In one suitable arrangement, storage 13 may store software such as computer code (e.g., lists of instructions) that may be executed by processing circuitry on controller server 18 such as processing circuitry 15. Processing circuitry 15 may include one or more processors (e.g., central processing units (CPUs), microprocessors, or other control circuitry). Processing circuitry 15 may, for example, execute instructions or code stored on storage 13 (sometimes referred to herein as memory 13) to perform desired operations (e.g., operations associated with controlling and operating controller server 18 in controlling switches in a switch network, performing operations for a user, etc.). Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
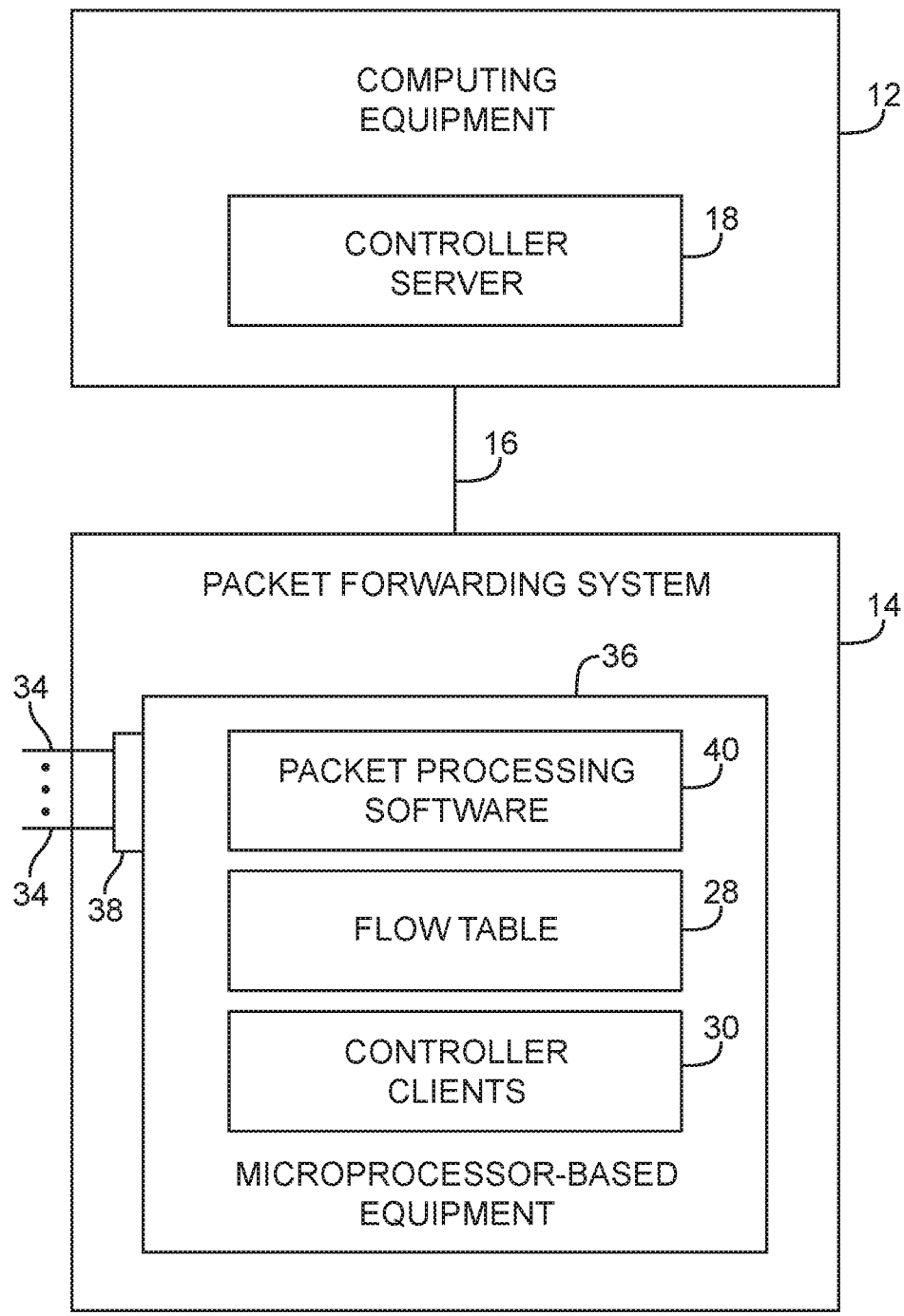
FIG. 2 is a diagram showing how a packet forwarding system may be implemented using microprocessor-based equipment that runs a packet processing engine in accordance with an embodiment.

If desired, switch 14 may be implemented using a general-purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
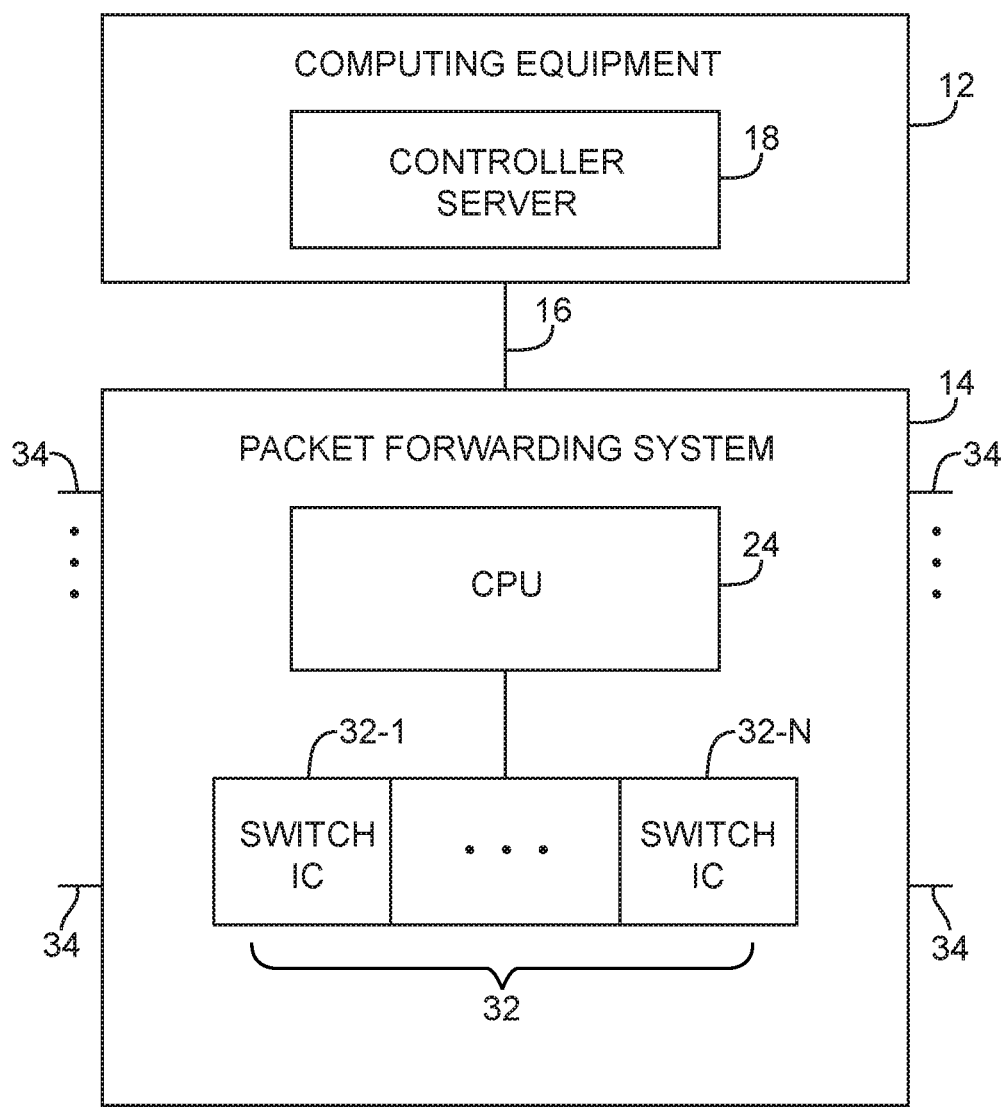
FIG. 3 is a diagram of a packet forwarding system and associated controller in which the packet forwarding system includes a control unit and associated switching integrated circuits in accordance with an embodiment.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
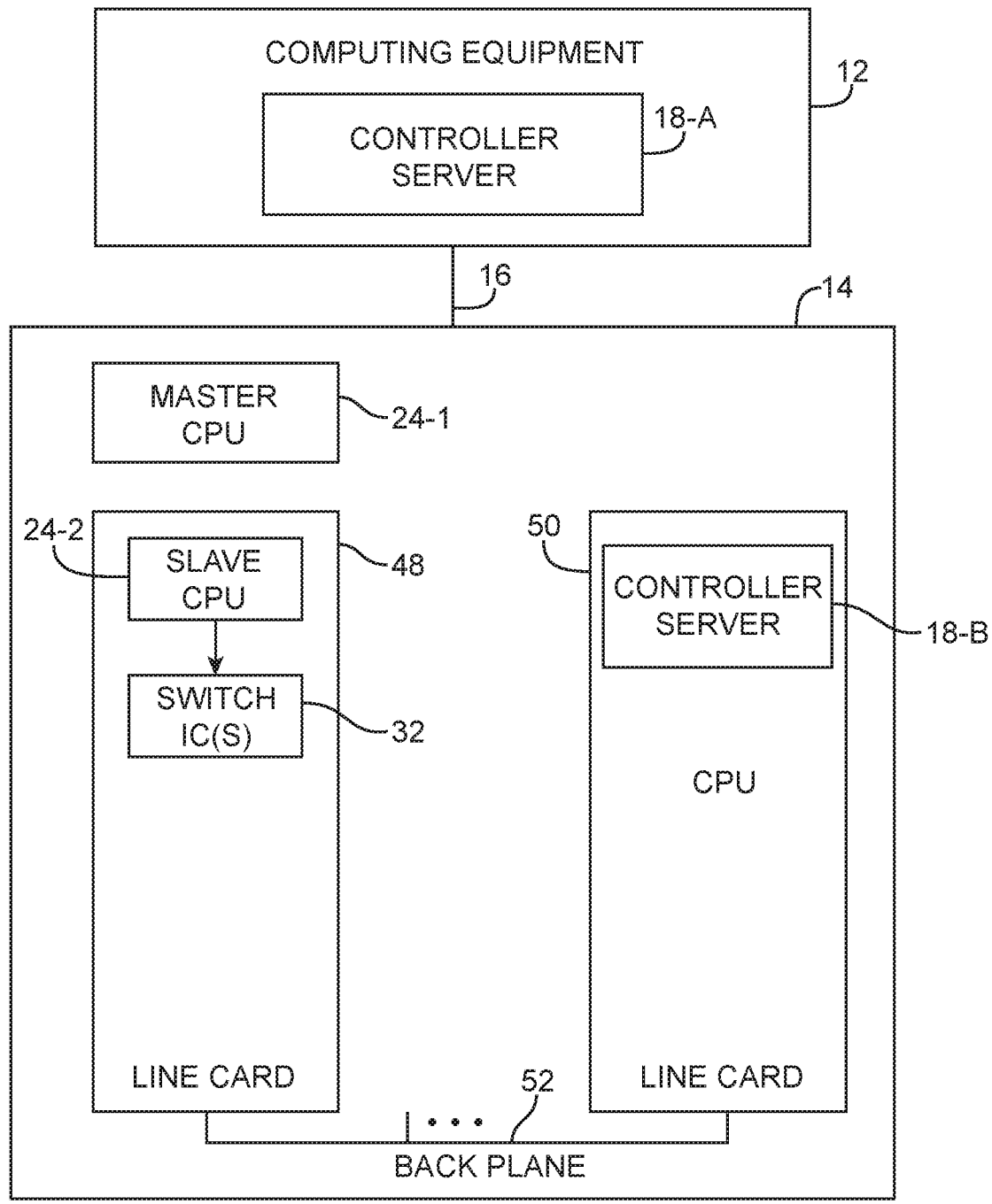
FIG. 4 is a diagram of a network in which a packet forwarding system has master and slave controllers and in which a controller server may be implemented on remote computing equipment or on a line card in the packet forwarding system in accordance with an embodiment.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
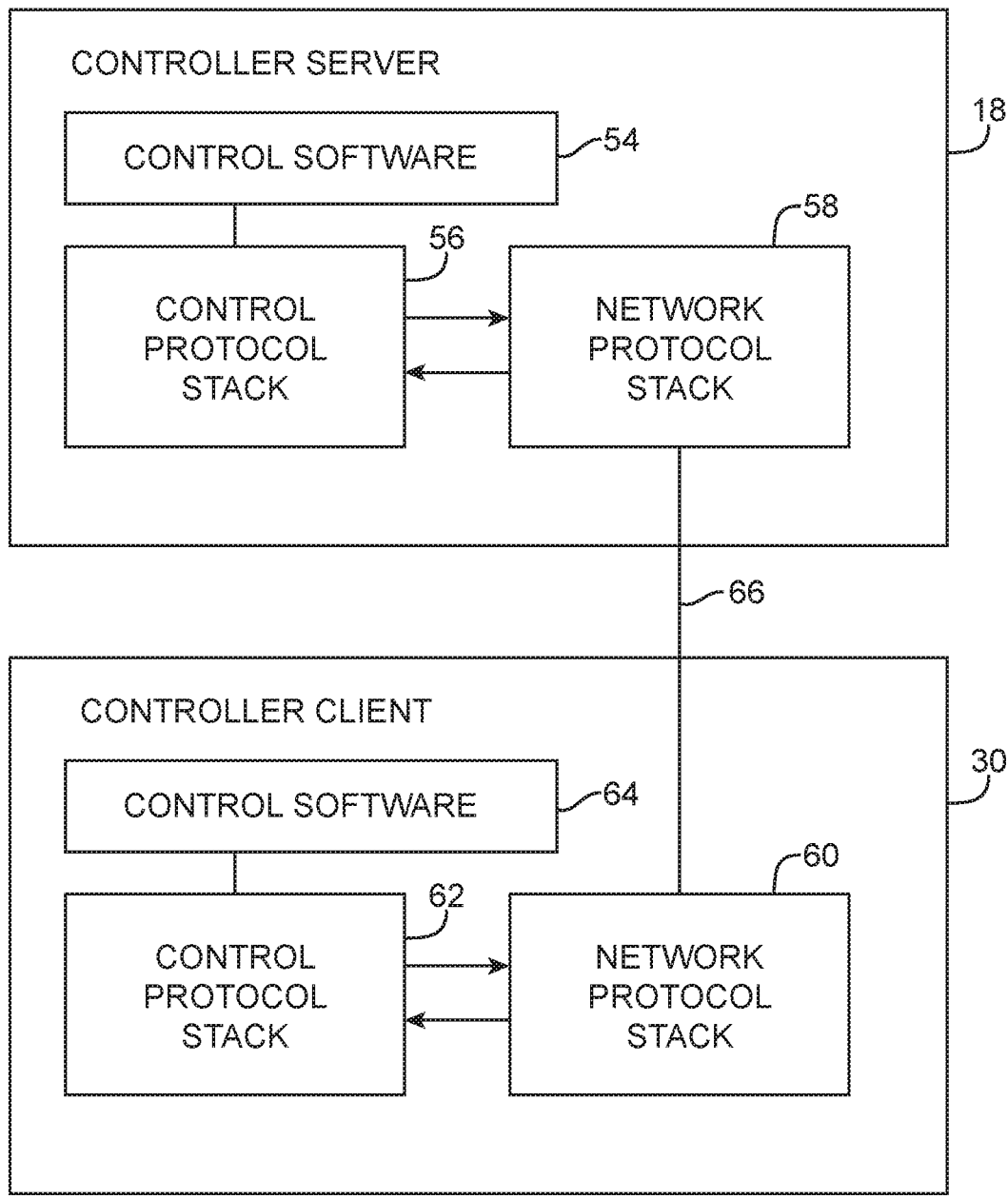
FIG. 5 is a diagram of a controller server and controller client that may communicate over a network connection in accordance with an embodiment.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 or other OpenFlow protocols (as examples).

Flow table 28 contains flow table entries (e.g., rows in the table) that have multiple fields (sometimes referred to as header fields). The fields in a network packet (sometimes referred to herein as a data packet or network data packet) that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
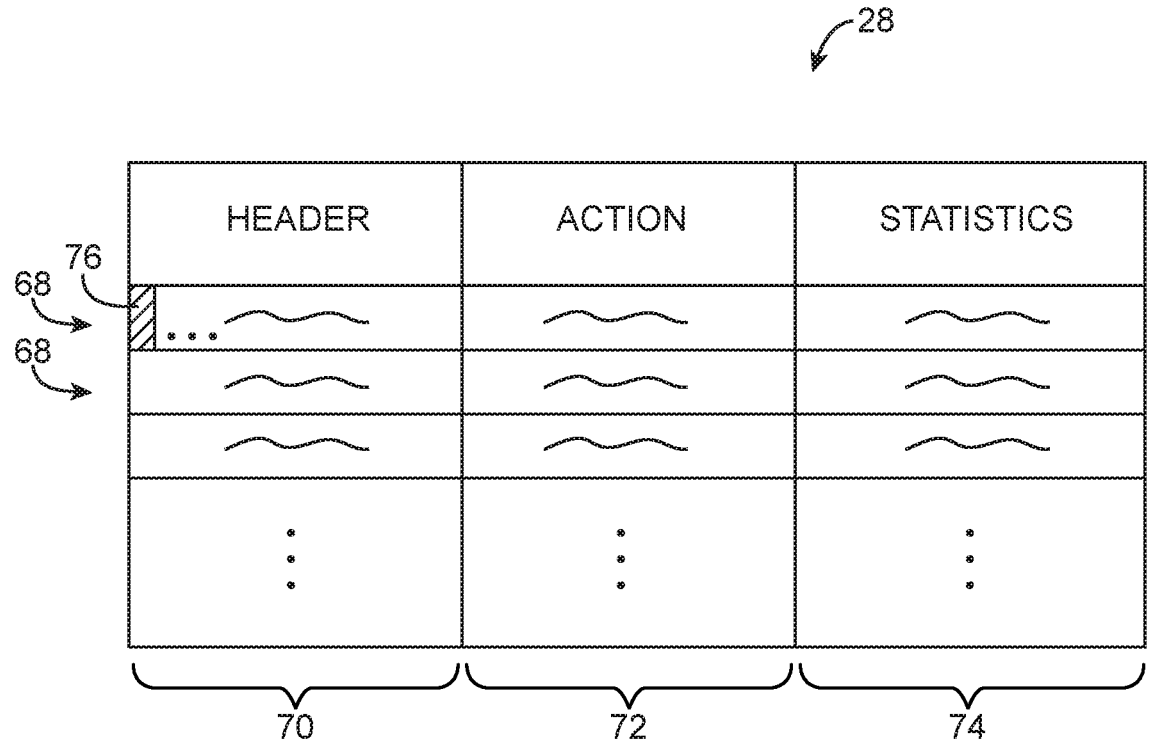
FIG. 6A is a diagram of an illustrative forwarding flow table of the type that may be used by a packet processing system in accordance with an embodiment.

An illustrative flow table is shown in FIG. 6A. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type (Ethertype), virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). In one suitable arrangement, the action field may instruct switch 14 to encapsulate a network packet using an on-switch encapsulation engine and to forward the encapsulated packet over a particular port (e.g., a network tunnel port). Similarly, the action field may instruct switch 14 to de-encapsulate an encapsulated network packet received over a particular port (e.g., a network tunnel port). Additional actions that may be taken by switch 14 include: an enqueue action to forward a packet through a queue attached to a port, a copy action (e.g., to provide copied network traffic at an identified port), and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. These examples are merely illustrative and, in general, any desired actions may be performed.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real-time in response to receipt and processing of packets at controller server 18 from switches such as switch 14. In a network with numerous switches 14, each switch can be provided with appropriate (e.g., respective) flow table entries to form a path through the network (e.g., a path that implements desired network forwarding and configuration rules or policies).

Figure 7:
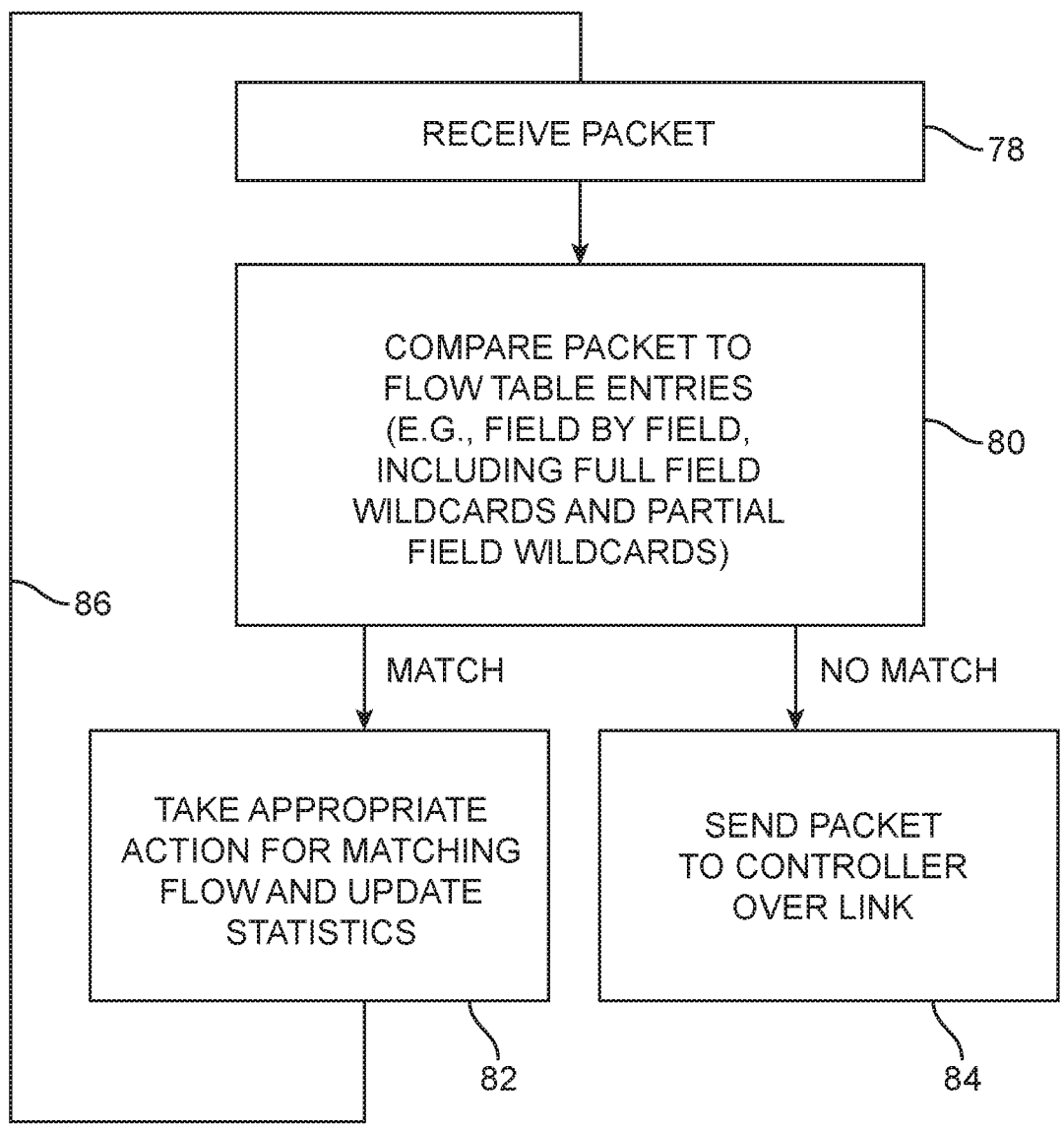
FIG. 7 is a flow chart of illustrative steps involved in processing packets in a packet processing system in accordance with an embodiment.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

As networks grow in complexity and size, there is increasing interest and need for network monitoring and analysis. In particular, it may be desirable to generate network flow information to consolidate traffic information for easier export and analysis. However, existing systems of generating network flow information lack the flexibility to generate network flow records having a variety of user-desired fields and attributes, or in other cases, require a large number of extraneous instructions even in generating records having a small number of fields. As an example, about 400 sets of instructions are required to populate a record with four fields because an abstract description of the record is interpreted for each received network packet or frame and instructions to populate each given field needs to be found in a corresponding portion of the abstract description before populating the given field. In other worth, even portions of the abstract description that are unrelated to a given field will be traversed, leading to wasting large amounts of time. To generate network flow information having flexible attributes in an efficient manner, illustrative network flow information generation circuitry may be coupled to switches in a traffic monitoring network and may dynamically generate instructions for generating network flow information (e.g., flow information records or flow records).

Figure 8:
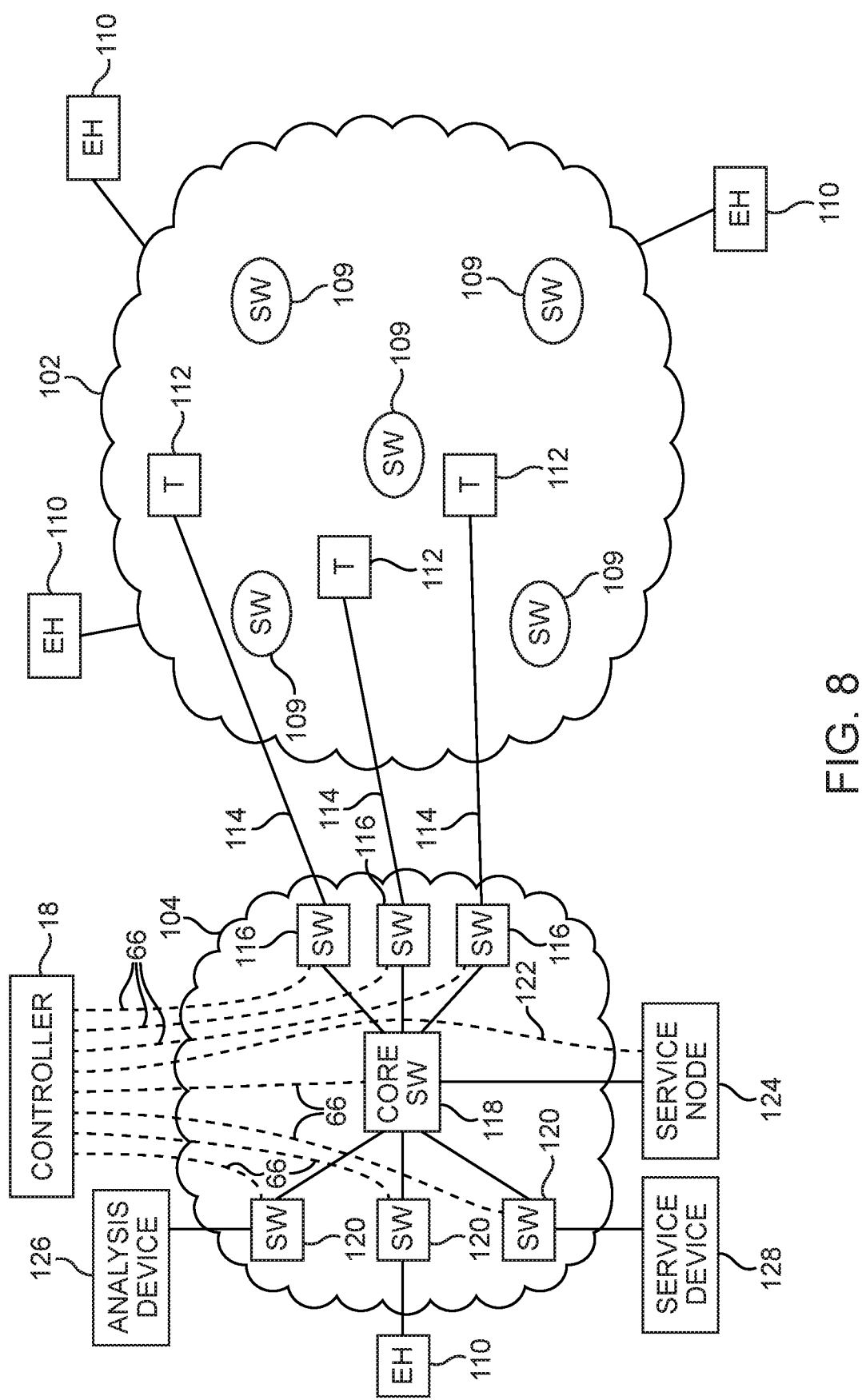
FIG. 8 is a diagram of an illustrative traffic monitoring network including a controller that controls switches in the traffic monitoring network to generate network flow information in accordance with an embodiment.

FIG. 8 shows how a traffic monitoring network, such as traffic monitoring network 104 coupled to network 102, may include switches coupled to flow information generation circuitry 124 (sometimes referred to herein as a service node 124 or network traffic monitoring device 124). Controller server 18 may help ensure efficient operation of traffic monitoring network 104 and flow information generation circuitry 124 in generating flow information associated with network traffic (e.g., network traffic in network 102). Controller server 18 may sometimes be referred to herein as switch controller 18, controller 18, or computing equipment 18. Traffic monitoring network 104 may sometimes be referred to herein as monitoring network 104, analysis network 104, packet monitoring network 104, monitoring switch fabric 104, or monitoring fabric 104. Network 102 may sometimes be referred to herein as forwarding network 102, production network 102, production switch fabric 102, or production fabric 102. Production network 102 may, for example, be implemented locally (e.g., at a particular geographic location such as a school or college campus, server or data farm, building, business campus, airport, hospital, other locations having networks managed by one or more network administrators, etc.) or may be distributed across multiple geographic locations. Monitoring network 104 may, for example, be implemented locally (e.g., at the same geographic location as part or all of production network 102), may be implemented at a different geographic location than production network 102 (e.g., may be remote from network 102), or may be distributed across multiple locations, if desired.

Production network 102 may include switches 109 (or other packet forwarding systems similar to switches 14 of FIGS. 1-4) that forward network traffic between end hosts (EH) such as end hosts 110 of production network 102. For example, switches 109 may be interconnected via network paths coupled between ports of the switches. Network monitoring devices such as network tap devices 112 may be used to "tap" network traffic flows in production network 102 by sending copies of network packets observed by tap devices 112 to monitoring network 104 via paths 114 (sometimes referred to herein as tap paths). Network tap devices 112 may be interposed between network elements to monitor network traffic between the network elements. For example, a network tap device 112 may be interposed between ports of first and second switches to monitor traffic from the first to the second switch (or vice versa or both). The network tap devices may monitor traffic without interfering with network traffic flow between network elements.

If desired, network tap devices 112 may send network packets observed by tap devices 112 instead of copies of the network packets. If desired, one or more network tap devices 112 may be included in one or more of switches 109. As an example, tap operations may be performed by connecting to circuitry on one or more of switches 109 to monitor traffic received by the one or more of switches 109.

Monitoring network 104 may include switches 116, 118, and 120 (or other packet forwarding systems similar to switches 14 of FIGS. 1-4) that are controlled by controller 18 and may sometimes be referred to as client switches. As an example, switches 116, 118, and 120 may include controller clients that communicate with controller 18 via control paths 66. Switches that do not communicate with controller 18 via control paths 66 (e.g., because the switches do not include controller clients) may be referred to as non-client switches. In the example of FIG. 8, switches 116, 118, and 120 are merely illustrative. If desired, monitoring network 104 may include any number of switches, may include switches that do not communicate with controller 18 and may be referred to as non-client switches, etc. If desired, the non-client switches of production network 102 may communicate with controller 18 or may communicate with a different controller (not shown). These examples are merely illustrative.

Monitoring network 104 may include one or more core switches 118 that direct traffic between other switches (e.g., from switches 116 to switches 120 or vice versa). As an example, switches 116 may be placed between production network 102 and core switch 118 to directly receive tapped traffic from production network 102. In other words, tap paths 114 may be directly connected to client switches 116 of monitoring network 104 (e.g., at ports 34 of the client switches such as switches 116 as shown in FIG. 1). Ports 34 of client switches 116 that are coupled to tap paths 14 may sometimes be referred to as filter ports, ingress interfaces, or ingress ports of monitoring network 104, because the switch ports serve to interface with incoming network traffic from tap devices 112. Controller 18 may control client switches 116 to forward copied network traffic received from tap devices 112 (sometimes referred to herein as tapped traffic or tapped packets) to desired end hosts of network 104 and/or to controller 18 (e.g., to one or more analysis devices 126, service devices 128, and/or network flow information generation circuitry 124). Core switches 118 may route the tapped traffic from switches 116 to switches 120 directly coupled to analysis devices (e.g., analysis devices 126), service devices (e.g., service devices 128), and/or other end hosts (e.g., end host 110).

In particular, monitoring network 104 may be coupled to analysis devices such as devices 126 that perform network analysis operations on traffic tapped from taps 112 in production network 102. If desired, monitoring network 104 may be coupled to service devices such as service devices 128 that perform network service operations on traffic tapped from taps 112 in production network 102. Analysis devices 126 may include network analysis tools such as network performance monitors, network capacity analysis tools, network outage analysis tools, or other network analysis tools for analyzing production network 102 based on tapped network traffic flows. The network analysis tools may, for example, be implemented on computing equipment that serve as end hosts of monitoring network 104.

Service devices 128 may serve to manipulate network traffic flows prior to analysis by devices 126 if desired. Service devices 128 may manipulate network traffic flows by replacing, removing, or otherwise modifying information stored in network packets of the traffic flows. Service devices 128 may, for example, include packet slicing tools, time-stamping tools, or other tools implemented using computing equipment. Multiple tools may be implemented on a service device 128, which serves as an end host of monitoring network 104.

To efficiently generate network flow information having flexible fields, monitoring network 104 may also be coupled to network flow information generation circuitry 124 or service node 124. Service node 124 may be coupled to core switch 118 to receive tapped network traffic (e.g., via intervening switches 116) from production network 102. By coupling service node 124 to a core switch that receives traffic from multiple other switches, it may be easier to receive a large amount of tapped network traffic. This is merely illustrative. If desired, service node 124 may be coupled any other switch in monitoring network 104 (e.g., one or more of switches 116 and 120) in addition to or instead of core switch 118. If desired, service node 124 may be coupled to more than one core switch (e.g., coupled to multiple cores switches).

Service node 124 may serve to generate flow information records (sometimes referred to herein as flow records or simply records) associated with network traffic (e.g., tapped network traffic from production network 102). As an example, when a network packet is sent from a first end host to a second end host in production network 102, service node 124 may receive the network packet (e.g., a copy of the network packet) through switches 116 and 118 and generate a record associated with the network packet and/or update an existing record associated with the network packet. The record may include information associated with the network packet such as an IP address associated with the source end host, an IP address associated with the destination end host, a size of the packet, a number of network packets sent between the source and destination end hosts, etc. In other words, the record may consolidate information and provide a summary of different flows between different end hosts (e.g., between the exemplary first and second end hosts) in a given time frame or while a given condition holds true. Service node 124 may generate one or more such records (e.g., a record for each possible end host pair, records for end host pairs between which there is network traffic, records only for source end hosts, records only for destination end hosts, records not related to end hosts, records based on any other criteria, etc.).

Controller 18 may control switches in monitoring network 104 (and optionally switches in production network 102) to convey network packet or frame information (e.g., to forward network packets, to forward copies of network packets, to forward only packet information associated with the network packets, but not the network packets themselves, etc.) to service node 124. As an example, service node 124 may track all packets received at and forwarded from core switch 118 and/or any other switch coupled to service node 124.

Service node 124 may be coupled to controller 18 via path 122. Controller 18 may provide information (e.g., policy information sometimes referred to herein as a network flow information generation policy) over path 122 to configure service node 124 to generate desirable flow information (e.g., to generate flow information records having desirable attributes or fields, to generate flow information records having user-specified attributes or fields, etc.). In particular, controller 18 may provide control signals (e.g., signals to enable service node 124 to begin flow information generation operations, signals to stop service node 124 from generating flow information, signals to update one or more settings of service node 124, etc.), data signals (e.g., data signals indicating which portion of the network traffic should be recorded at service node 124, data signals indicating fields or attributes to be captured in a record, data signals indicating a time period over which records should be updated or stored, data signals indicating a stop criteria to stop flow information generation, data signals indicating a destination such as device 126 or 128 for an export of the records, etc.), and/or any other suitable signals over path 122 to service node 124. These control, information, and data signal may constitute a network flow information generation policy.

Based on the signals provided from controller 18 (e.g., over path 122), service node 124 may dynamically generate instructions to generate and/or update flow information records. In other words, service node 124 may begin generating the instructions to perform network flow information generation operations only after sufficient information has been provided from controller 18. Controller 18 may send the information to service node 124 when it is determined that service node 124 will begin operations (based on user input, because on a satisfied condition, etc.). As such, service node 124 may generate in real-time or dynamically the instructions to perform network flow information generation operations.

In particular, the generated instructions may correspond to a specific record description (sometimes referred to herein as a record template or flow record template). The generated instructions may be executed to generate each record having the specific record description. As an example, controller 18 may provide a record description (e.g., a user-defined record description indicating which fields should be provided in a record) to service node 124. Based on the record description, service node 124 may generate a set of instructions associated with populating or updating the fields in the record (e.g., populating a source address field, searching for an existing record having the source address field, populating packet size information, incrementing packet size information in the existing record, updating packet data information, updating information in an existing record, etc.). By dynamically generating instructions for specifically for populating records according to a given record description, network flow information generation circuitry 124 may omit any excess instructions generally associated with repeatedly interpreting abstract record descriptions while maintaining flexibility in forming records with various fields.

The configuration of FIG. 8 is merely illustrative. If desired, multiple analysis devices 126, multiple service devices 128, multiple service nodes 124, and/or multiple other end hosts 110 may be coupled to switches in monitoring network 104. Service node 124 may be implemented on separate circuitry distinct from another circuitry coupled to monitoring network 104. If desired, one or more service nodes 124 may be implemented on separate or the same circuitry, implemented on controller circuitry (e.g., in controller 18), service device circuitry (e.g., in service device 128), analysis device circuitry (e.g., in analysis device 126), end host circuitry (e.g., in end host 110), etc. Analysis devices 126 and service devices 128 may be omitted if desired.

Figure 9:
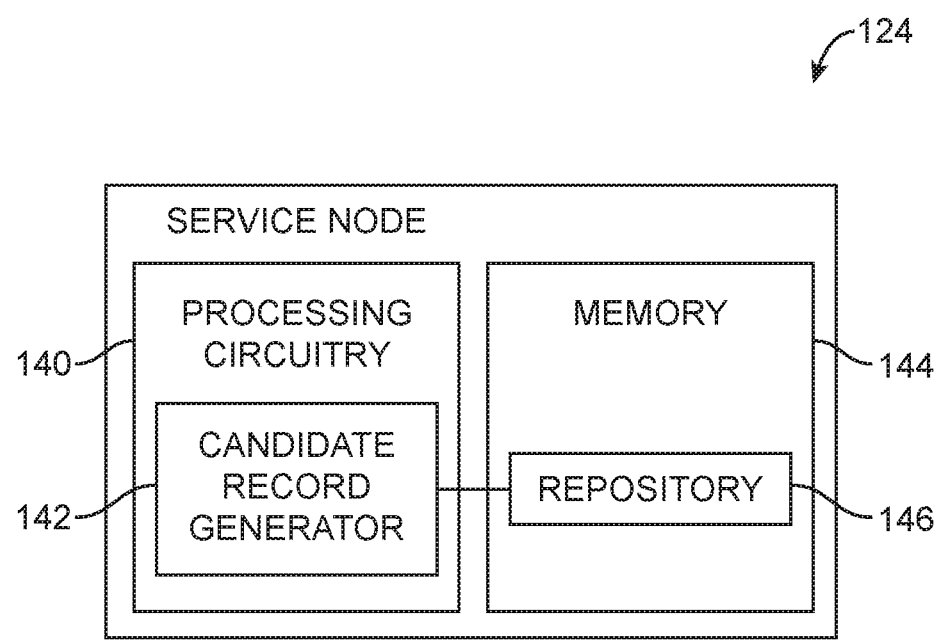
FIG. 9 is a diagram of illustrative flow information generation circuitry in accordance with an embodiment.

FIG. 9 shows an exemplary implementation of network flow information generation circuitry such as service node 124 in FIG. 8. As shown in FIG. 9, service node 124 may include processing circuitry 140 and memory circuitry 144. More specifically, processing circuitry 140 may form candidate record generator 142 configured to generate candidate records associated with each received network packet. Candidate record generator 142 may be coupled to a repository or database of records 146. As an example, candidate record generator 142 may provide new records to repository 146 for storage. As another example, candidate record generator 142 may update existing records stored at repository 146 (based on a generated candidate record).

Processing circuitry 140 may also include instruction generation circuitry for generating specific instructions for a record description received at service node 124. In particular, these instructions may be executed by candidate record generator to generate candidate records according to the record description. If desired, the generated instructions may be stored at memory 144 to be accessed and executed when a new network packet or frame is received by service node 124. Processing circuitry 140 may also include comparison or lookup circuitry such as hashing circuitry that performs hashing functions on packet information (e.g., as one or more keys) to generate hash values. If desired, the generated hash values may be stored in memory 144 alongside repository 146 (e.g., as a part of repository 146, in a different portion of memory 144 but correspond to portions of repository 146). These hash values may serve as lookup values when accessing or finding records in repository 146.

If desired, service node 124 may be formed from commodity hardware. If desired, service node 124 may be formed from specialized hardware. Analysis devices 126, service devices 128, and network flow information generation circuitry 124 may be formed on separate hosts (e.g., separate computers, servers, or other end hosts of monitoring network 104) or two or more of analysis devices 126, service devices 128, and network flow information generation circuitry 124 may be formed on the same (shared) host (e.g., the same computer, server, etc.). In another suitable arrangement, two or more of service devices 128, analysis devices 126, and network flow information generation circuitry 124 may be implemented on separate integrated circuits or using separate processors and storage on the same computer or server (e.g., on the same end host of network flow information generation circuitry 124).

FIG. 9 is merely illustrative. If desired, service node 124 may include any other circuitry to implement additional functionalities or more efficiently perform any of the above-mentioned functions (e.g., specialized hashing circuitry, specialized lookup circuitry, specialized instructions generation circuitry, etc.). As an example, service node 124 may generate and store records consistent with a consolidation protocol (e.g., IP flow information export (IPFIX), NetFlow version 5, NetFlow version 9, etc.)

Figure 10:
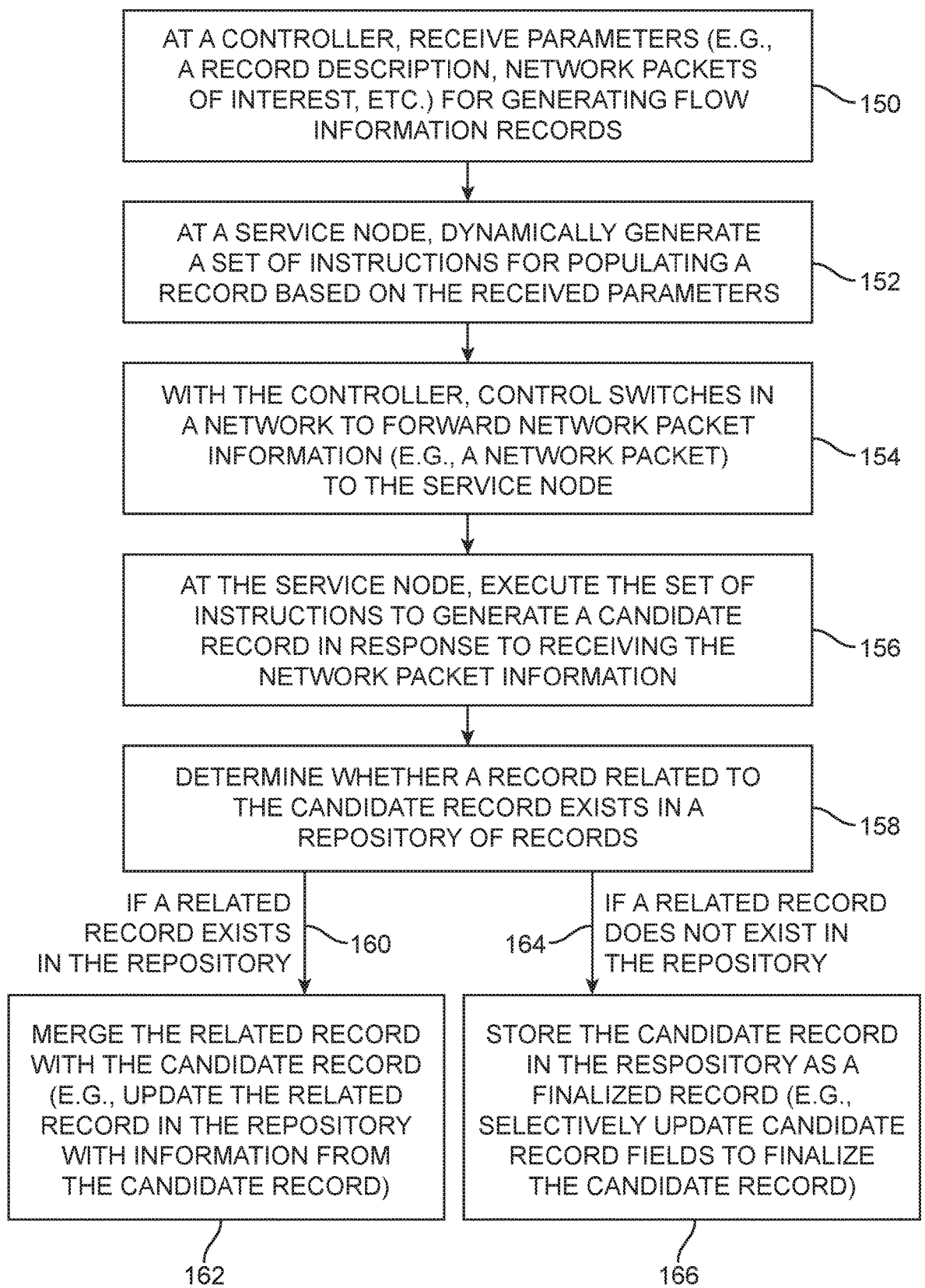
FIG. 10 is a flow chart of illustrative steps for generating network flow information using flow information generation circuitry in accordance with an embodiment.

FIG. 10 shows a flow chart of illustrative step for operating network flow information generation circuitry (such as service node 124 in FIGS. 8 and 9) coupled to a network (e.g., monitoring network 104) having switches controlled by a controller. At step 150, a controller (e.g., controller 18 in FIG. 8) may receive parameters for generating flow information records or network traffic monitoring parameters. As an example, controller 18 may receive a record description (e.g., a description of how many fields are in a record, which fields are in a record, what flow information is collected, what packet information is extracted, etc.). As another example, controller 18 may receive information indicating network packets or frames of interest for which flow information is collected (e.g., a subset of network traffic in a production and/or monitoring network to be characterized, a set of network packets associated with one or more originating and/or terminating end hosts, etc.).

If desired, a user may provide the parameters received at controller 18. As examples, a user may select one or more fields to include in a record, a user may select from a template from a set of record description templates that includes a preselected set of fields to include in a record, a user may provide any suitable information to provide controller 18 with the parameters, a user may perform one or more of these actions and any other actions to provide controller 18 with record description information. If desired, controller 18 may select a record description based on a particular application. As an example, for providing flow information (e.g., a flow information export) to a security application (e.g., in service device 128 or analysis device 126 in FIG. 8), controller 18 may select a first record description that includes security parameters (e.g., having security-related information fields).

At step 152, the controller (e.g., controller 18) may provide the received parameters to a service node (e.g., service node 124). Service node 124 (e.g., processing circuitry 140 in FIG. 9) may dynamically generate a set of instructions for populating a record based on the received parameters. The generated set of instructions may be specific to the received record description and/or the specified network packets of interest. As such, service node 124 may dynamically generate a new set of instructions when parameters for generating flow information (e.g., a record description, intended application of flow information, etc.) are updated or changed. By dynamically generating the set of instructions for specific received parameters, unrelated instructions may be omitted to improve execution time and free up processing resources when creating network flow information records.

At step 154, the controller (e.g., controller 18) may control switches in a network to forward network packet information to network flow information generating circuitry (e.g., service node 124). As an example, controller 18 may control switches 116, 118, and 120 in monitoring network 104 in FIG. 8 to forward tapped traffic to service node 124. Controller 18 may also control tap devices 112 and/or switches 109 to forward traffic to service node 124 if desired. In particular, a given network packet may be copied at tap device 112 and the copied network packet may be forwarded to core switch 118 via tap path 114 and switch 116 (e.g., an ingress interface at switch 116). Service node 124 coupled to core switch 118 may receive the copied network packet, may receive information for the copied network packet without receiving the copied network packet.

At step 156, in response to receiving the network packet information, the service node (e.g., candidate record generator 142 in FIG. 9) may execute the set of instructions generated at step 152 for populating a record based on the received parameters to generate a candidate record. As an example, the set of instructions may include instructions to extract packet information from the copied network packet and populating corresponding fields in the candidate record based on the extracted packet information.

At step 158, the service node may determine whether a record related to the candidate record already exists in a repository of records (e.g., repository 146 in FIG. 9). As an example, the related record may have a source end host identifier and/or a destination end host identifier that matches that of the candidate record. If desired, the related record may have any one or more fields associated with one or more flow information types that matches that of the candidate record. The one or more matching fields may include fields indicating flow information from a first end host, to a second end host, between two end particular end hosts, between specific domains, across multiple different domains, or any other type of flow information. If desired, the one or more matching fields between related records may be received as a parameter at step 150. The related records may be determined by a user based on the type of network flow being characterized.

If a related record exists in the repository, processing may proceed via path 160 to step 162. At step 162, the service node (e.g., service node 124) may merge (or reconcile) the related record with the candidate record. As an example, the candidate record may include a number of fields, one or more of which may require to be merged to maintain an accurate flow information record. The service node may update the existing related record in the repository with information from the candidate record (e.g., a number of packets field in the existing record may be incremented by one to reflect the received network packet associated with the candidate record, a cumulative byte count field may be incremented by the packet size of the received network packet, etc.). The candidate record may also include a number of fields, one or more of which may not be mergeable. As an example, these non-mergeable fields may be a source identifier field, a destination identifier field. Service node 125 may keep these non-mergeable fields in the existing record the same. If desired, the candidate record may include new fields that do not correspond to fields in the existing record, and information in the new fields may be added to the corresponding fields in the existing record.

If a related record does not exist in the repository, processing may proceed via path 164 to step 166. At step 166, the service node (e.g., service node 124) may store the candidate record in the repository as an active record. As an example, service node 124 may update candidate record fields as necessary to finalize the candidate record and generate the active record. The finalized record may be stored in repository 146 in FIG. 9.

As an example, the set of instructions dynamically generated at the service node in step 152 may also include instructions for executing the steps of 158, 162, and 166. In particular, the set of instructions may include instructions for looking-up a possibly existing related record, instructions for determining whether to merge the candidate record or to store the candidate record.

If desired, the service node may continue generating candidate records as described in steps 156-166 (e.g., using the same set of instructions generated at step 152). When new parameters are received at the controller and subsequently at the service node, step 152 may be processed again to generate a new set of instructions corresponding to the new parameters. In this scenario, the controller may continue forwarding network packet information to the service node (e.g., step 154), and steps 156-166 may be processed using the new set of instructions.

If desired, after a suitable amount of flow information has been collected (e.g., after a given time period, after extracting packet information from a give number of packets, etc.) the records stored in repository 146 may be exported (e.g., to an end host, to an analysis device, to a service device, to the controller, etc.). Along with the stored records, a record description and other flow information generation parameters of the stored records may also be exported. The record description and other flow information generation parameter may help the receiving device to correctly interpret the stored flow records.

The steps of FIG. 10 are merely illustrative. If desired, one or more of these steps may be processed in parallel, one or more of these steps may be omitted, the order of one or more of these steps may be changed. If desired, additional steps may be added to perform additional functionalities.

Figure 11:
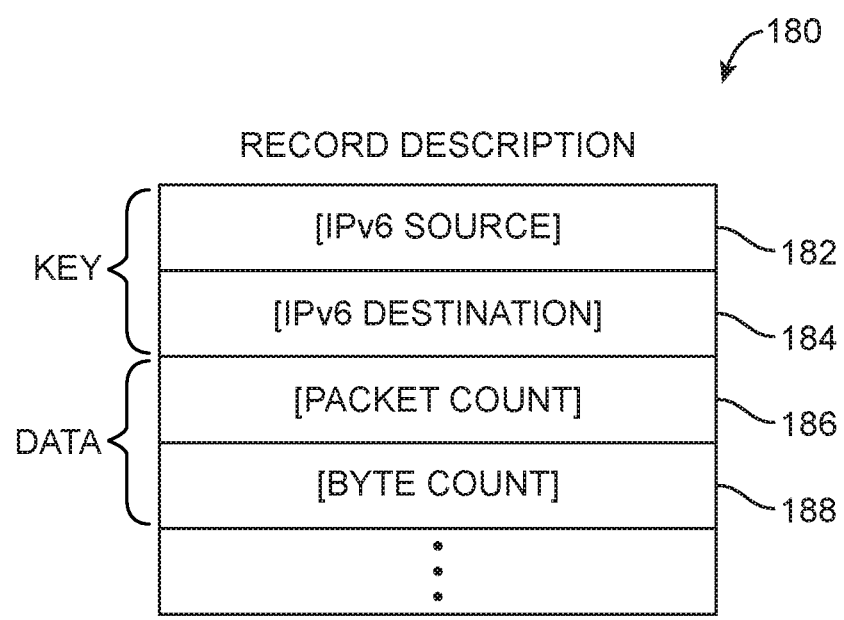
FIG. 11 is a flow chart of illustrative steps for performing lookup operations to consolidate network flow information in accordance with an embodiment.

FIG. 11 shows an illustrative record description such as record description 180 having a number of fields 182-188. A record description may form (a portion of) a network flow information generation policy. As shown in FIG. 11, a record description may specify IPv6 SOURCE field 182, IPv6 DESTINATION field 184, PACKET COUNT field 186, and BYTE COUNT field 188. Record description 180 may include any number of additional fields if desired. Candidate records may be generated based on the fields specified in the record description (e.g., for record description 180, a candidate record may include fields 182-188). Similarly, stored records in repository 146 may also have the fields specified in the record description. In particular, the record description may be separated into key fields (e.g., fields 182 and 184) and data fields (e.g., fields 186 and 188). The key and data fields may be distinguished by various standards such as those dictated by Request of Comment (RFC) documents (e.g., RFC 3917, RFC 7011-7015, RFC 5103, RFC 3955, RFC 5153, RFC 5470-5473, RFC 7011-7015, etc.) as an example.

The example of FIG. 11 is merely illustrative. If desired, any suitable fields may be used in a record description. As an example, using IPv4, key fields may include a source IPv4 address, a destination IPv4 address, a protocol identifier, a source port, a destination port, etc., and data fields may include a packet count, time elapsed for flow information collection, byte count, etc. As another example, using IPv6, key fields may include a source IPv6 address, a destination IPv6 address, a protocol identifier, a source port, a destination port, etc., and data fields may include a packet count, time elapsed for flow information collection, byte count, etc. If desired, other key fields may also include an Ethernet type field, destination and source MAC address fields, protocol version fields and any other suitable key fields. Other data fields may include minimum and maximum total length fields, flow measurement duration fields, and any other suitable data fields.

A record description may be generated based on one or more of these key and data fields. In some scenarios, there may be fields that are incompatible in a single record description. As an example, a destination IPv6 address field may be incompatible with a source IPv4 address if presented in a single record description. In this case, controller 18 and/or service node 124 (e.g., processing circuitry 140) may reject the record description and/or modify the record description to be proper.

To further improve the operation of service node 124 (in FIG. 9), and more specifically, to efficiently determine whether a stored record related to a generated candidate record exists in repository 146 (in FIG. 9), key fields (e.g., fields 182 and 184 in FIG. 11) may be used as keys and hashed to generate corresponding hash values to be stored in memory 144 (in FIG. 9). In particular, repository 146 may include a portion of memory 144 that is used to store the hash values. As an example, processing circuitry 140 in service node 124 (in FIG. 9) may be configured to perform hash functions to generate the hash values. In particular, processing circuitry 140 may be configured to perform simultaneous vector hashing for eight different vectors in parallel (as an example). However, if desired, any type of hashing or vector hashing operations may be performed by processing circuitry 140.

Figure 12:
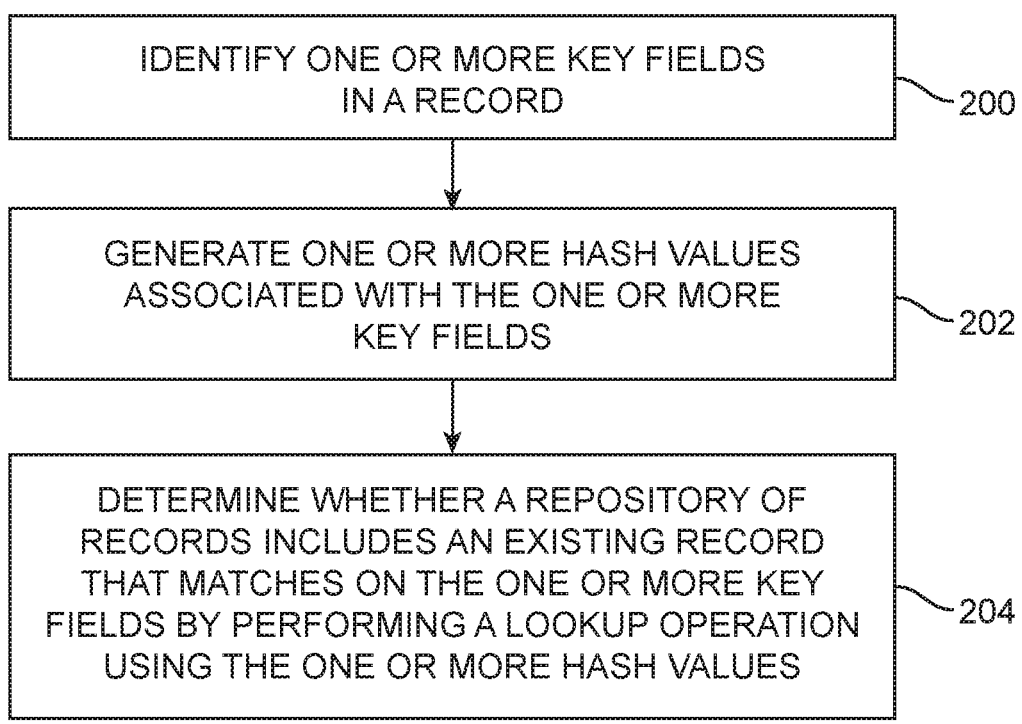
FIG. 12 is a diagram of an illustrative record description for records representing network flow information in accordance with an embodiment.

FIG. 12 shows a flow chart of illustrative steps for performing record lookup operations in a repository of records based on a hashing scheme (e.g., based on a hash table or based on a hash-based data storage structure). To generate hash values associated with the hashing scheme, processing circuitry 140 (in FIG. 9) may use key fields in a record as keys to the hash function.

At step 200, processing circuitry 140 may identify one or more key fields in a record (e.g., in a candidate record). As an example, processing circuitry 140 may identify one or both fields of key fields 182 and 184. In particular, processing circuitry 140 may identify the source IPv6 address information and destination IPv6 address information before the address information are populated into the corresponding candidate record (e.g., before step 156 in FIG. 10).

At step 202, processing circuitry 140 may generate one or more hash values associated the one or more key fields. As an example, processing circuitry 140 may generate a given hash value using one or both of the source and destination IPv6 addresses as keys to a hash function.

At step 204, processing circuitry 140 may determine whether a repository of records includes an existing record (e.g., an actual or finalized record) that matches on the one or more key fields by performing a lookup operation using the generated one or more hash values. As an example, processing circuitry 140 may use the generated given hash value to search repository 146 for an existing record having an associated hash value that matches the given hash value. This implies that the key fields used to generate the hash value for the candidate record matches those of the existing record. If no match is found, then there may be no such existing record.

If desired, step 204 in FIG. 12 may be performed as part of step 158 in FIG. 10. If desired, steps 200 and 202 in FIG. 12 may be performed as part of step 156 in FIG. 10. In other words, steps 200 and 202 may be processed in parallel with step 156. For example, when service node 124 executes the set of instructions to populate fields in a candidate record, the service node may simultaneously execute a second set of instructions to identify the key fields (e.g., information to be stored in the key fields) and generate one or more hash values based on the identified key fields. If desired, the second set of instructions may also be dynamically generated at step 152 in FIG. 10 (e.g., the set of instructions described in connection with step 152 may already include the second set of instructions).

In the scenario where step 204 is processed as a part of step 158, processing may still proceed via one of paths 160 and 164. Step 162 may similarly be processed as described above. Step 166 may include an additional instruction to store the generated hash value as part of repository 146 such that the generated hash value may be associated with the finalized record. In other words, when the hash value is found, the associated finalized record is also found (e.g., without much more computation as in a hash table).

As described above, the steps of FIG. 12 may be incorporated into the steps of FIG. 10 if desired. As another example, the steps of FIG. 10 may be performed without the steps of FIG. 12. For example, when a record does not hold key fields, or holds key fields with small values, it may be desirable to omit the hash lookup scheme described in FIG. 12. This is merely illustrative. If desired, a hash lookup scheme may be applied to any portion of the information stored in a record.

Figure 13:
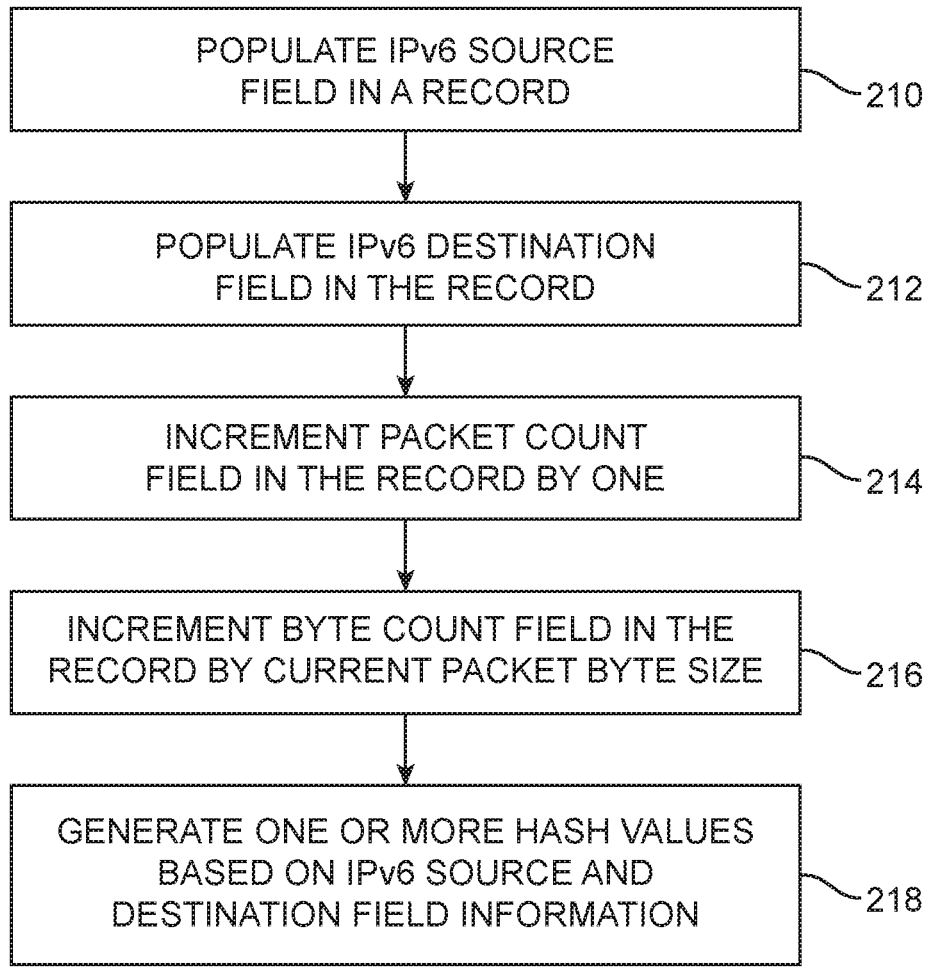
FIG. 13 is a flow chart of illustrative steps for generating a record having an exemplary record description in accordance with an embodiment.

FIG. 13 shows an illustrative set of instructions that may be dynamically generated by network flow information generation circuitry (e.g., generated by service node 124 in processing step 152 in FIG. 10). In particular, the set of instructions shown in FIG. 13 may be dynamically generated for a record description such as record description 180 in FIG. 11.

In particular, the set of instructions may include instructions to populate IPv6 SOURCE field 182 in a candidate record with the source IPv6 address of the associated network packet or frame (at step 210), instructions to populate IVv6 DESTINATION field 184 in the candidate record with the destination IPv6 address of the associated network packet or frame (at step 212), instructions to increment packet count field 186 in the candidate record by one (e.g., in a scenario where packet count field is initialized to a value of zero), and instructions to increment byte count field 188 in the candidate record by a byte size of the associated network packet (e.g., in a scenario where the packet count field is initialized to a value of zero). The set of instructions may also include, at step 218, generate one or more hash values based on (one or both of) IPv6 SOURCE field information and IPv6 DESTINATION field information.

The set of instructions in FIG. 13 is merely illustrative. If desired, the order of execution of this set of instructions may be modified. Step 214 may be processed between step 210, step 218 may be processed before step 210, etc. If desired, processing circuitry 140 may execute two steps in parallel. As an example, processing circuitry 140 may process step 218 in parallel with one or both of steps 210 and 220. If desired, one or more instructions may be omitted. As an example, step 218 may be omitted if a hash-based lookup scheme is not implemented. If desired, a complete set of instructions generated by service node 124 based on received parameters may include a number of additional instructions or steps.

As examples, additional instructions may include, instructions to populate other fields in a candidate record, instructions to determine whether an existing record is already stored in a repository, instructions to perform lookup operations, instructions to merge a related record with a candidate record, instructions to finalize and store a candidate record in a repository, etc. If desired, any suitable number of instructions of any suitable type may be added to the set of instructions in FIG. 13 in any order.

Controller 18, network flow information generation circuitry 124, and client switches 14 may be configured to perform the above-described operations (e.g., the operations of FIGS. 1-13) using hardware such as circuitry (e.g., processing circuitry 140 in service node 124) and/or software such as code (e.g., pseudo-code instructions in FIG. 13) that runs on hardware. Code for performing such operations may be stored on non-transitory computer readable storage media. The code may sometimes be referred to as data, software, program instructions, code, or instructions. The non-transitory computer readable storage media may include non-volatile memory, removable media such as one or more removable flash drives, one or more hard drives or disks, other computer readable media, or combinations of these or other storage. Code (software) stored on the non-transitory computer readable media may be executed by processing circuitry on controller 18, switches 14, and/or network flow information generation circuitry 124 if desired. This processing circuitry may include central processing units (CPUs), integrated circuits such as application-specific integrated circuits with processing circuitry, microprocessors, or other processing circuitry.

The foregoing is merely illustrative of the principles of this invention and various modifications can be made by those skilled in the art without departing from the scope and spirit of the invention.

What is claimed is:

1. A method of using a controller that controls client switches in a monitoring network having network interfaces that are coupled to a packet forwarding network and that receive tapped network packets from the packet forwarding network, the method comprising:
   at a service node coupled to the monitoring network, receiving a flow record template;
   at the service node, after receiving the flow record template, generating a list of instructions based on the received flow record template;
   with the controller, identifying a set of the tapped network packets based on which flow records are generated;
   with the controller, forwarding packet information in the set of the tapped network packets to the service node; and
   at the service node, executing the list of instructions for each tapped network packet in the set of the tapped network packets to generate a corresponding flow record.

2. The method defined in claim 1, wherein the list of instructions includes an instruction to populate a source address field in a given flow record for a given tapped network packet and an instruction to populate a destination address field in the given flow record for the given tapped network packet.

3. The method defined in claim 2, wherein the list of instructions includes an instruction to generate a hash value for the given flow record using at least one of the source address field or the destination address field in the given flow record as a key input.

4. The method defined in claim 3, wherein the list of instructions includes an instruction to perform lookup operations using the generated hash value for the given flow record to determine whether a related flow record is stored in a repository of flow records in the service node.

5. The method defined in claim 4, wherein the list of instructions includes an instruction to update a packet count field in the given flow record.

6. The method defined in claim 1, wherein the client switches comprise at least one core switch, wherein the service node is connected to the at least one core switch, and wherein forwarding the packet information comprises forwarding the packet information via the network interfaces and via the at least one core switch to the service node.

7. A method of operating computing equipment that is coupled to flow information generation circuitry and that controls client switches in a monitoring network having a filter port that is coupled to a packet forwarding network and that receives tapped network packets from the packet forwarding network, the method comprising:
   with the computing equipment, providing configuration information to the flow information generation circuitry via a control path;
   with processing circuitry in the flow information generation circuitry, after receiving the configuration information, generating a set of instructions to generate candidate flow records and to reconcile the generated candidate flow records with any related active records based on the received configuration information;
   with the computing equipment, forwarding at least one network packet in the tapped network packets to the flow information generation circuitry through a forwarding path; and
   with the processing circuitry in the flow information generation circuitry, executing the set of instructions based on the at least one network packet to generate a corresponding candidate flow record and to reconcile the corresponding candidate flow record with any related active records.

8. The method defined in claim 7, wherein the flow information generation circuitry comprises memory that stores active records and the set of generated instructions.

9. The method defined in claim 8, wherein the processing circuitry is coupled to the memory, the method further comprising:
   with the processing circuitry in the flow information generation circuitry, performing multiple hashing operations in parallel using packet information in the at least one network packet and using additional packet information in an additional network packet.

10. The method defined in claim 1, wherein the flow record template comprises a record description for the flow records, and wherein the list of instructions is specific to the record description.

11. The method defined in claim 10, wherein the record description includes at least one key field, and wherein the list of instructions includes an instruction to generate a hash value based on the at least one key field.

12. The method defined in claim 11, wherein executing the list of instructions for each tapped network packet in the set of the tapped network packets to generate the flow record comprises, for a given tapped network packet in the set of the tapped network packets, performing a lookup operation in a database of flow records using a given hash value for the given tapped network packet generated based on the instruction to generate the hash value based on the at least one key field.

13. The method defined in claim 1, wherein executing the list of instructions for each tapped network packet in the set of the tapped network packets to generate the flow record comprises, for a given tapped network packet in the set of the tapped network packets, generating a candidate flow record for the given tapped network packet.

14. The method defined in claim 13, wherein executing the list of instructions for each tapped network packet in the set of the tapped network packets to generate the flow record comprises, for the given tapped network packet, determining whether an active flow record related to the candidate flow record exists in a database of active flow records.

15. The method defined in claim 14, wherein executing the list of instructions for each tapped network packet in the set of the tapped network packets to generate the flow record comprises, for the given tapped network packet, merging the candidate flow record with the related active flow record, in response to determining that the related active flow record exists in the database of active flow records.

16. The method defined in claim 15, wherein active flow records in the database, including the related active flow record merged with the candidate flow record, are consistent with at least a consolidation protocol selected from the group consisting of an IP flow information export protocol and a NetFlow protocol.

17. The method defined in claim 14, wherein executing the list of instructions for each tapped network packet in the set of the tapped network packets to generate the flow record comprises, for the given tapped network packet, finalizing the candidate flow record and storing the finalized candidate flow record as an additional active flow record in the database of active flow records, in response to determining that no related active flow record exists in the database of active flow records.

18. The method defined in claim 17, wherein active flow records in the database, including the additional active flow record, are consistent with at least a consolidation protocol selected from the group consisting of an IP flow information export protocol and a NetFlow protocol.

19. The method defined in claim 14, further comprising:
with the controller, controlling the client switches to export the database of active flow records to an end host coupled to the monitoring network.

20. The method defined in claim 19, wherein controlling the client switches to export the database of active flow records to the end host comprises exporting active flow records stored at the database to the end host and exporting information associated with the flow record template to the end host.

\* \* \* \* \*